United States Patent [19]
Yun

[11] Patent Number: 6,131,103
[45] Date of Patent: Oct. 10, 2000

[54] METHOD FOR CHANGING FONT SIZE OF WIDGET IN BASE STATION MANAGER OF CELLULAR TELEPHONE SYSTEM

[75] Inventor: Eun-Chul Yun, Seoul, Rep. of Korea

[73] Assignee: Samsung Electronics Co., Ltd., Rep. of Korea

[21] Appl. No.: 08/995,731

[22] Filed: Dec. 22, 1997

[30] Foreign Application Priority Data

Mar. 31, 1997 [KR] Rep. of Korea ............ 97-11660

[51] Int. Cl.[7] ............................................. G06F 3/14
[52] U.S. Cl. ............................................. 707/542; 345/472
[58] Field of Search ................................. 345/439, 467, 345/472; 707/527–542

[56] References Cited

U.S. PATENT DOCUMENTS 5,001,697 3/1991 Torres ............................... 345/439
5,341,466 8/1994 Perlin et al. ....................... 345/439
5,485,563 1/1996 Fisher ............................... 345/439
5,634,064 5/1997 Warnock et al. .................. 707/513
5,754,873 5/1998 Nolan ............................... 707/527

OTHER PUBLICATIONS

Thomas S. Tullis, "Readability of fonts in the windows environment"; *Conference companion on Human factors in computing system*, 1995, pp. 127–128.

*Primary Examiner*—Stephen S. Hong
*Attorney, Agent, or Firm*—Dilworth & Barrese

[57] ABSTRACT

A base station manager for use in a cellular telephone system includes fonts having different sizes. The base station manager detects a change in a size of a widget, measures the size of the size-changed widget, measures the size of the fonts associated with the size-changed widget, compares the size of the fonts with the size of the size-changed widget and reads pre-stored fonts corresponding to the size-changed widget, and changes the font size of the size-changed widget into the size of the pre-stored fonts. In this manner, the base station manager of the invention may readily change the font size according to the variation of the widget size, without incurring additional expenses.

3 Claims, 5 Drawing Sheets

METHOD FOR CHANGING FONT SIZE OF WIDGET IN BASE STATION MANAGER OF CELLULAR TELEPHONE SYSTEM

BACKGROUND OF THE INVENTION

1. Field of the Invention

The present invention relates to a method for changing a widget font size of a base station manager in a cellular telephone system, and more particularly to a method for changing a font size of a widget according to a widget size on an alarm screen of a base station manager.

2. Description of the Related Art

In a cellular telephone system, a base station manager (BSM) functions as a work station with a display to manage and maintain the whole cellular telephone system. The base station manager displays an operational status of the cellular telephone system on an X-window and an alarm screen generated by means of a motif programming. The motif is a congregation of user interface objects which are referred to as a "widget", and the motif widget includes all the objects regarding the graphic user interface, such as a pull-down menu, a dialogue box, a scroll bar, a push button, etc.

Referring to FIG. 1, a CDMA (Code Division Multiple Access) digital cellular telephone system to which the present invention is applicable includes a plurality of mobile stations (MS) 101–10n, a base station transceiver subsystem (BTS) 110, a base station controller (BSC) 120, a base station manager (BSM) 130, and a mobile switching center (MSC) 140. The mobile stations 101–10n (sometimes called terminal equipments) perform radio communication with the base station transceiver subsystem 110. The base station controller 120 connected between the base station transceiver subsystem 110 and the mobile switching center 140 controls overall communications associated with the base station transceiver subsystem 110. The base station manager 130 includes a CPU (Central Processing Unit; not shown) and a memory (not shown). The base station manager 130 is connected to the base station controller 120 and matches operators in the base station transceiver subsystem 110. The mobile switching center 140 connected to the base station controller 120 switches the mobile stations 101 and 10n.

FIG. 2 illustrates an alarm screen with a number of motif widgets of the base station manager 130 in the cellular telephone system. As illustrated, an alarm screen 200 includes a number of motif widgets 210, 220, 230, 241, and 242 each having different sizes. The sizes of the motif widgets are freely changeable.

Referring to FIGS. 1 and 2, descriptions will now be given on the operation of the base station manager 130 which changes the sizes of the motif widgets on the alarm screen 200. String fonts in the motif widgets 210, 220, 230, 241 and 242 are determined when the motif widgets are first generated. Thus, it is generally difficult to change the font size, once the widgets are generated. Therefore, although the widgets 210, 220, 230, 241 and 242 are of different sizes, the string fonts of the respective widgets have the same size. For example, although the base station manager 130 has reduced the widget size, the font size of the strings is not reduced. In such a case, the strings at the outer side of the widget will disadvantageously appear to be cut out. To the contrary, although the base station manager 130 enlarges the widget size, the font size of the strings remains the same. Thus, the strings appear relatively small, so that the user may not be able to conveniently read the strings. Such a constant font size irrespective of the variation of the widget size may reduce aesthetic effects, as well as functional effects.

Conventionally, the base station manager 130 utilizes a graphic tool such as SL-GMS, in order to adjust the font size according to the size variation of the alarm screen 200. However, in case of using the SL-GMS graphic tool, the base station manager 130 becomes expensive and needs a large amount of extra memory. Further, it takes a prohibitive amount of time to change the font size according to the size variation of the alarm screen 200.

SUMMARY OF THE INVENTION

It is an object of the present invention to provide a method for detecting a widget size to change a font size of a string according to the detected widget size.

According to an aspect of the present invention, a base station manager of a cellular telephone system with fonts having different sizes, detects a variation of (change in) a size of the widget; measures the size of a size-changed widget; measures the size of the fonts associated with the size-changed widget; compares the size of the fonts with the size of the size-changed widget and reads pre-stored fonts corresponding to the size-changed widget; and changes the font size associated with the size-changed widget into the size of the pre-stored fonts.

The base station manager compares a horizontal length of the size-changed widget with a value obtained by multiplying a horizontal length of the fonts by a horizontal length of a string in the size-changed widget to change the font size of the size-changed widget into the size of the pre-stored fonts, if the multiplied value is less than the horizontal length of the size-changed widget.

The base station manager compares a vertical length of the size-changed widget with a value obtained by multiplying a vertical length of the fonts by a vertical length of a string in the size-changed widget to change the font size of the size-changed widget into the size of the pre-stored fonts, if the multiplied value is less than the vertical length of the size-changed widget.

These and other objects, features and advantages of the present invention will become apparent from the following detailed description of illustrative embodiments thereof, which is to be read in connection with the accompanying drawings, in which like reference symbols indicate the same or similar components.

DETAILED DESCRIPTION OF PREFERRED EMBODIMENTS

Figure 1:
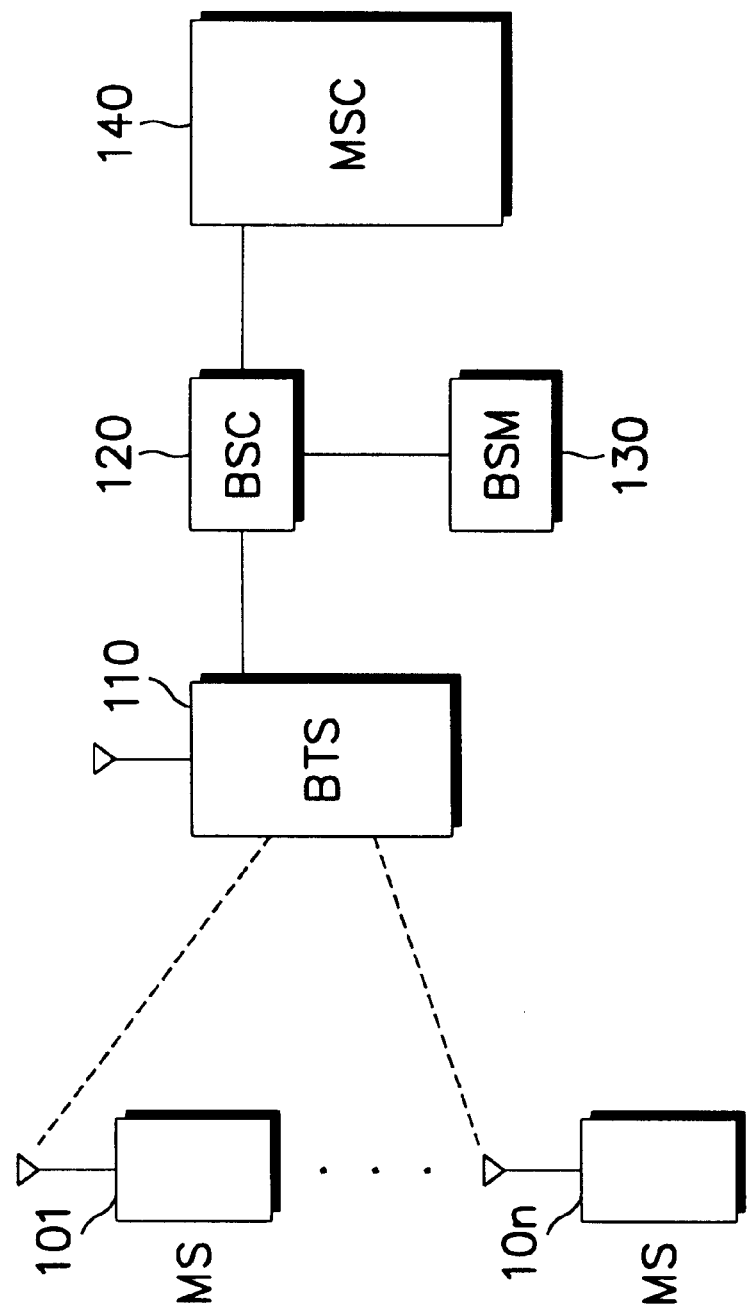
FIG. 1 is a block diagram of a digital cellular telephone system to which the present invention is applicable.
Figure 2:
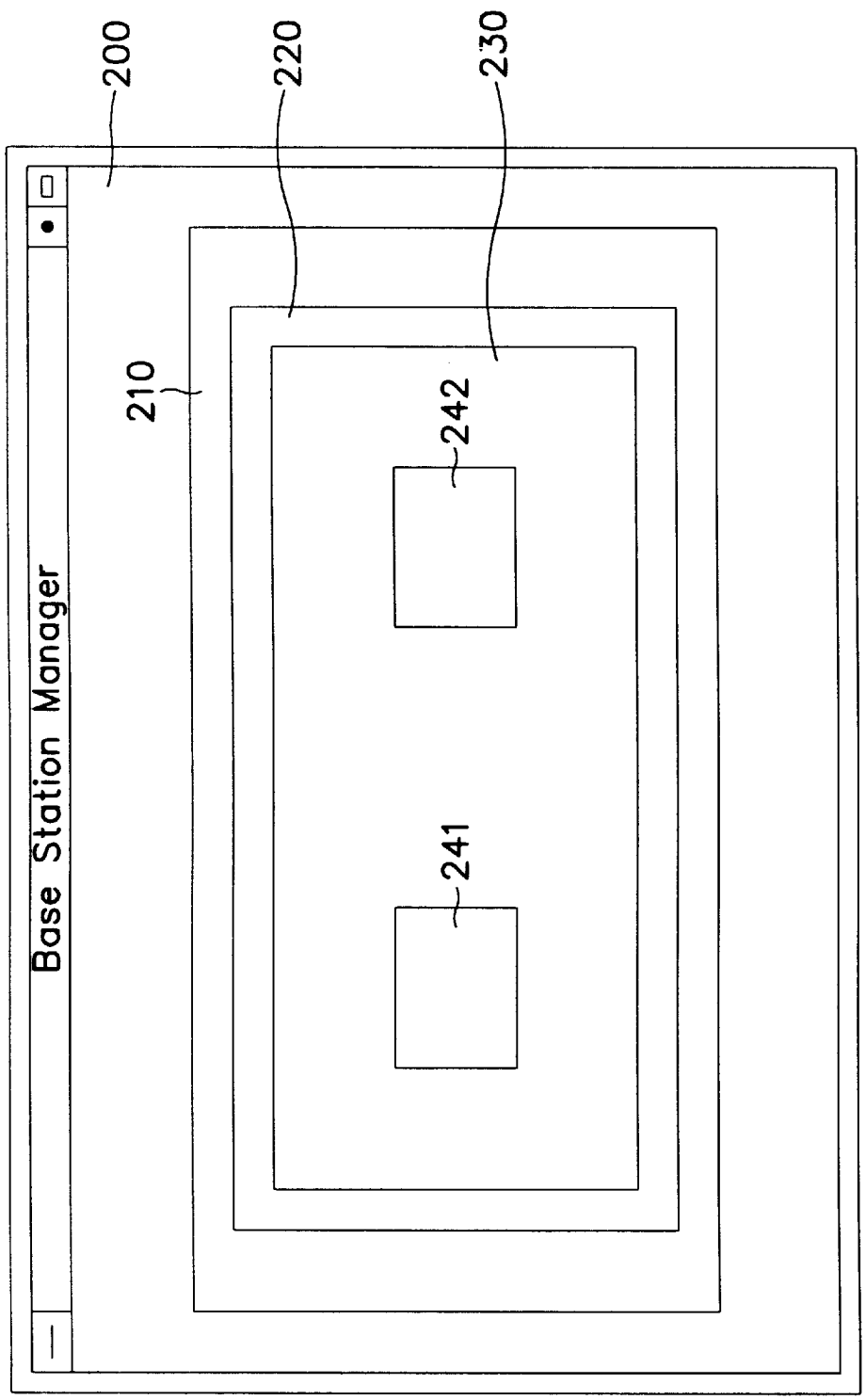
FIG. 2 is a diagram for showing an alarm screen with a plurality of motif widgets.
Figure 3:
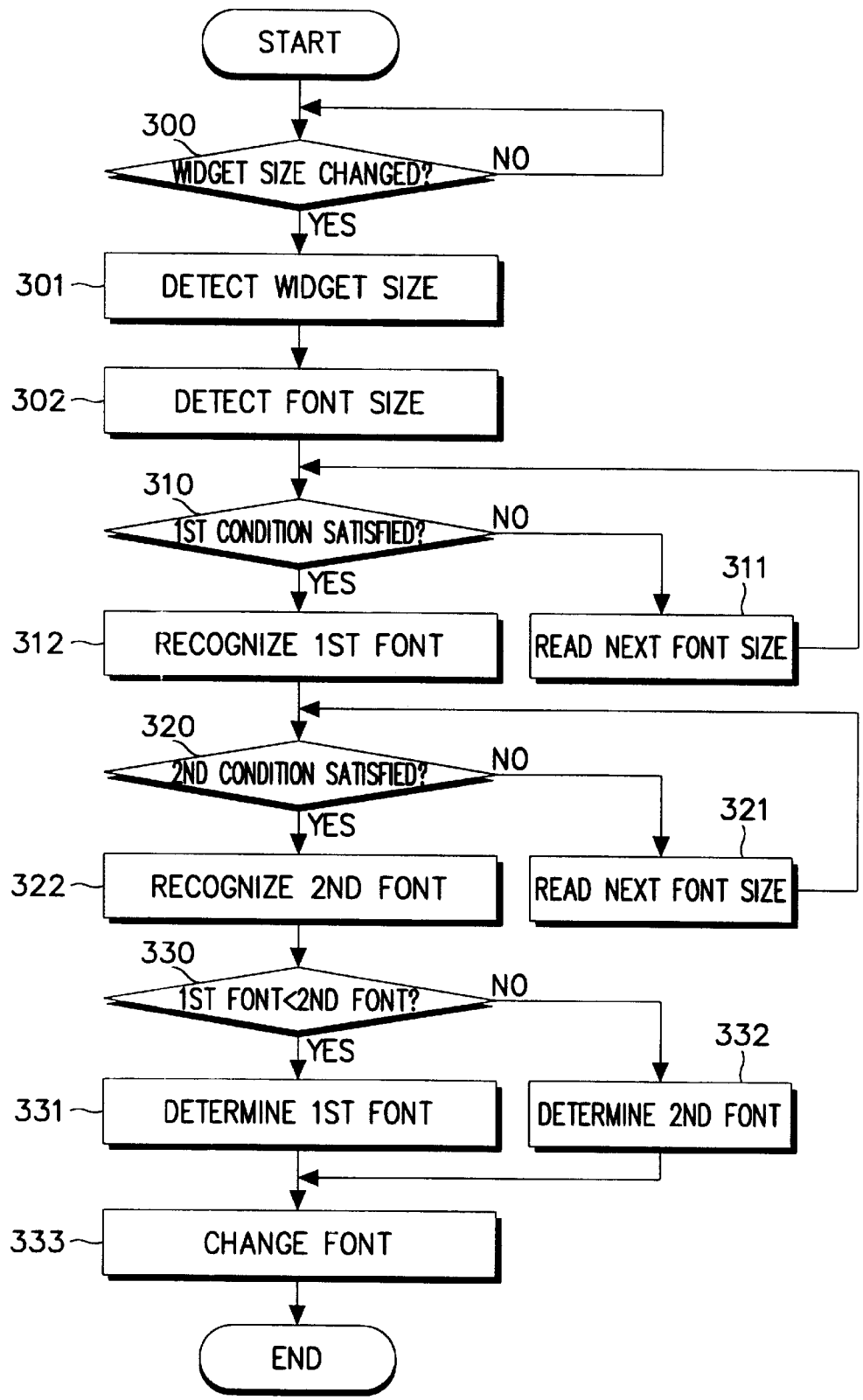
FIG. 3 is a flow chart for changing a font size according to a variation of a widget size according to an embodiment of the present invention.
Figure 4A:
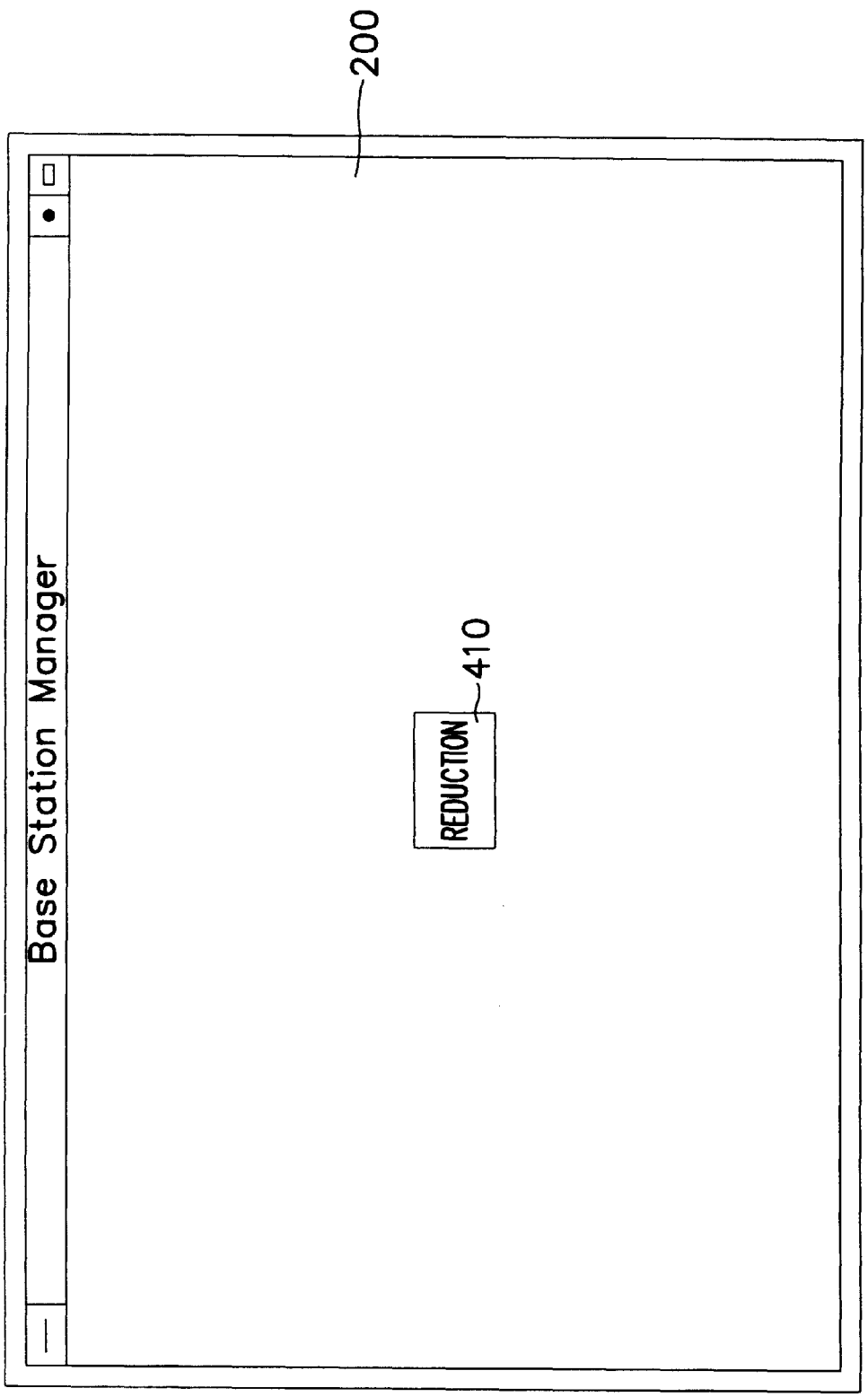
FIG. 4a is diagram for showing an alarm screen with a reduced widget according to an embodiment of the present invention.
Figure 4B:
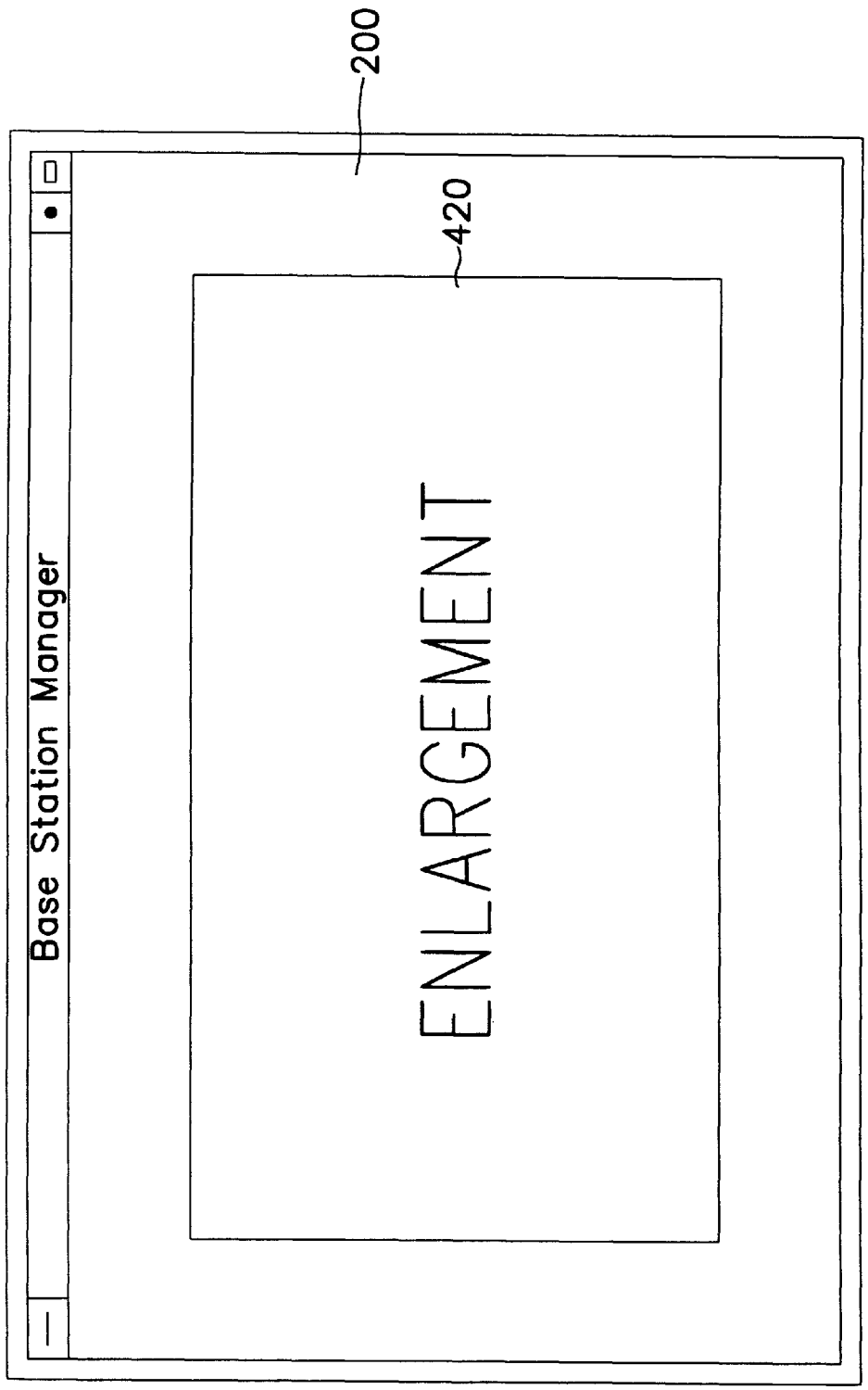
FIG. 4b is a diagram for showing the alarm screen with an enlarged widget according to an embodiment of the present invention.

FIG. 3 illustrates a flow chart for changing the font size of a string according to a variation of the widget size. FIG. 4a shows an alarm screen 200 with a reduced widget 410, and FIG. 4b shows the alarm screen 200 with an enlarged widget 420, in which the font sizes are proportionally changed according to a variation of the widget size, so that the string matches well with the widget.

Now, referring to FIG. 1 and FIGS. 3, 4a and 4b, descriptions will now be given on how to change the font size according to the variation of the widget size. The base station manager 130 includes a memory (not shown) for storing fonts of different sizes, and a CPU for sorting the fonts in the order of size. The CPU in the base station manager 130 checks, at a step 300 (FIG. 3), whether or not the widget size has been changed. If the widget size is changed, the CPU will detect vertical and horizontal lengths of the size-changed widget to find out an accurate size of the size-changed widget. Then, at a step 302, the CPU in the base station manager 130 checks vertical and horizontal lengths of the fonts stored in the memory to determine a proper size of the fonts given the changed size of the widget. The CPU checks at, a step 310, whether or not a value obtained by multiplying a horizontal length of a string in the widget by a horizontal length of the fonts stored in the memory is less than the horizontal length of the widget, which is called a first condition for convenience. If the answer is "No" (i.e., the first condition is not satisfied) at step 310, the CPU will read, at step 311, a next size font which is smaller than the font stored in the memory and then return to the step 310 to repeatedly check whether the first condition is satisfied. However, if the answer is "Yes" (i.e., the first condition is satisfied) at the step 310, the CPU will recognize the fonts that satisfy the first condition as first fonts, at a step 312.

The CPU checks, at a step 320, whether or not a value obtained by multiplying a vertical length of the string in the widget by the vertical length of the fonts stored in the U25 memory is less than the vertical length of the widget, which is called a second condition for convenience. If the answer is "No" at the step 320, the CPU will read, at step 321, a next size font which is smaller than the font stored in the memory and then return to the step 320 to repeatedly check whether the second condition is satisfied. However, if the answer is "Yes" at the step 320, the CPU will recognize the fonts that satisfy the second condition as second fonts, at a step 322.

Then, at step 330, the CPU compares the first fonts with the second fonts, to check whether the first fonts are smaller than the second fonts. If the first fonts are smaller than the second fonts, the CPU will determine the first fonts as the widget fonts, at a step 331, and change the string fonts in the widget into the first fonts at a step 333. However, if the first fonts are not smaller than the second fonts, the CPU will determine the second fonts as the widget fonts, at a step 332, and change the sting fonts, in the widget into the second fonts, at the step 333.

In view of the foregoing descriptions, the base station manager 130 reduces the font size as shown in FIG. 4a, if the widget 410 decreases in size. To the contrary, if the widget 420 is enlarged, the font size will be enlarged as shown in FIG. 4b.

As can be appreciated from the foregoing, the base station manager of the invention can readily change the font size according to the variation of the widget size, without incurring additional expenses. Further, compared with the conventional base station manager using the SL-GMS graphic tool, the base station manager of the present invention experiences less system load and provides for rapidly changing the font size.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for reducing graphic resources in a base station manager of a cellular telephone system, said method changing a font size of a widget including fonts having different sizes, comprising the steps of:

(a) detecting a change in size of the widget;

(b) measuring the current size of the entire size-changed widget;

(c) measuring the size of fonts associated with the size-changed widget;

(d) multiplying the horizontal length of the fonts by the horizontal length of a string in the size-changed widget to obtain a multiplied value;

(e) checking if the multiplied value of (d) is less than the horizontal length of the entire size-changed widget;

(f) multiplying a vertical length of the fonts by the vertical length of the string in the size-changed widget to obtain a multiplied value;

(g) checking if the multiplied value of (f) is less than the vertical length of the entire size-changed widget;

(h) selecting a smaller font of the font that satisfies (e) and the font that satisfies (g); and (i) changing the font in the size-changed widget to the smaller font from step (h).

2. The method as recited in claim 1, further comprising a step following step (e) of:

selecting another size font and repeating (d) and (e), if (e) is not true.

3. The method as recited in claim 1, further comprising a step following step (g) of:

selecting another size font and repeating (f) and (g), if (g) is not true.

* * * * *